United States Patent
Wu et al.

(10) Patent No.: US 9,497,620 B2
(45) Date of Patent: Nov. 15, 2016

(54) METHOD AND SYSTEM FOR IMPLEMENTING SMART CARD REMOTE OPERATION BASED ON SMART CARD WEB SERVER

(71) Applicant: HUIZHOU TCL MOBILE COMMUNICATION CO., LTD., Huizhou (CN)

(72) Inventors: Zhonghe Wu, Huizhou (CN); Tingting Xie, Huizhou (CN); Tao Tang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/395,894

(22) PCT Filed: Jun. 7, 2013

(86) PCT No.: PCT/CN2013/076896
§ 371 (c)(1),
(2) Date: Oct. 21, 2014

(87) PCT Pub. No.: WO2013/189244
PCT Pub. Date: Dec. 27, 2013

(65) Prior Publication Data
US 2015/0119017 A1    Apr. 30, 2015

(30) Foreign Application Priority Data
Jun. 21, 2012 (CN) .......................... 2012 1 0206494

(51) Int. Cl.
*H04M 3/00* (2006.01)
*H04W 8/24* (2009.01)
(Continued)

(52) U.S. Cl.
CPC .............. *H04W 8/245* (2013.01); *H04L 63/20* (2013.01); *H04W 4/001* (2013.01); *H04W 4/003* (2013.01);
(Continued)

(58) Field of Classification Search
CPC ..................... H04L 29/08; H04L 63/20; H04L 67/02; H04W 4/001; H04W 4/003; H04W 76/02; H04W 8/245
(Continued)

(56) References Cited

U.S. PATENT DOCUMENTS

2006/0079284 A1* 4/2006 Lu et al. ........................ 455/558
2007/0239857 A1* 10/2007 Mahalal ............... H04L 63/083
                                                                709/219

FOREIGN PATENT DOCUMENTS

CN    101588650 A    11/2009
CN    101996445 A    3/2011
(Continued)

OTHER PUBLICATIONS

Sjors Gielen, "SIM Toolkit in Practice," Bachelor Thesis, Radboud University in Nijmegen, The Netherlands, Aug. 27, 2012.*
(Continued)

*Primary Examiner* — Nader Bolourchi
(74) *Attorney, Agent, or Firm* — Shimokaji IP

(57) ABSTRACT

A method and system for implementing a smart card remote operation based on a smart card web server is provided. As a mobile phone is prompted to activate update by a short message transmitted thereto, the problem of addressing the mobile phone is effectively solved. A remote network is accessed by using a TCP/IP protocol stack to conveniently and reliably update bulk data. The mobile phone is used as a gateway to connect a smart card and a remote management server, thereby realizing security identity authentication,
(Continued)

data integrality verification, implementation of data encryption and customizable access policies, and increasing demand of an operator for enhancing value-added services of the smart card.

20 Claims, 2 Drawing Sheets

(51) Int. Cl.
    *H04L 29/06*     (2006.01)
    *H04W 4/00*     (2009.01)
    *H04W 76/02*     (2009.01)
    *H04W 8/20*     (2009.01)
    *H04L 29/08*     (2006.01)

(52) U.S. Cl.
    CPC .............. *H04W 8/205* (2013.01); *H04W 76/02* (2013.01); *H04L 67/02* (2013.01); *H04L 67/12* (2013.01)

(58) Field of Classification Search
    USPC ......................................................... 455/419
    See application file for complete search history.

(56) References Cited

FOREIGN PATENT DOCUMENTS

| CN | 102098663 A | 6/2011 |
|---|---|---|
| CN | 102724315 A | 10/2012 |
| CN | 102752375 A | 10/2012 |
| WO | 2010117118 A1 | 10/2010 |

OTHER PUBLICATIONS

ISO/IEC 7816-4: Identification cards—Integrated circuit cards—Part 4: Organization, security and commands for interchange, Second edition, Jan. 15, 2005.*
ETSI TS 102 124:"Smart Cards; Transport Protocol for UICC based Applications; Stage 1 (Release 6);" V6.1.0 (Dec. 2004), online: http://www.etsi.org/deliver/etsi_ts/102100_102199/102124/06.01.00_60/ts_102124v060100p.pdf).*
ETSI TS 102 223: "Smart Cards; Card Application Toolkit (CAT) (Release 10)," V10.5.0 (Sep. 2011), online: http://www.etsi.org/deliver/etsi_ts/102200_102299/102223/10.05.00_60/ts_102223v100500p.pdf.*
GSM 11.14: "European Telecommunications Standards Institute, France. Digital cellular telecommunications system (Phase 2+); Specification of the SIM application toolkit for the Subscriber Identity Module—Mobile Equipment (SIM—ME) interface," 1998.*

* cited by examiner

METHOD AND SYSTEM FOR IMPLEMENTING SMART CARD REMOTE OPERATION BASED ON SMART CARD WEB SERVER

TECHNICAL FIELD

The present disclosure relates to remote operations and data updates of a smart card, and in particular to a method and system for implementing a smart card remote operation based on a smart card web server.

BACKGROUND

Currently, most Subscriber Identity Module (SIM) cards present mobile value-added services using a SIM card development toolkit menu, which is specifically implemented through an Over The Air (OTA) technology via a short message channel. OTA technology is a technology based on a short message mechanism to realize a download, deletion and update of a service menu, inside a SIM card, through a mobile phone terminal and a remote server. OTA technology can provide data value-added services for users to obtain personalized information service. As limited by the short message channel, data, delivered by a SIM card and an OTA server, is on the order of a byte, which only contains a small quantity of text information, such as menus and access numbers. Thus, data carrying capacity is low, and it is impossible to download relatively large application services. Along with technological development generally, SIM card capacity has increased from the K level to the M and G level, and card manufacturers can preinstall many applications using large capacity cards and can store a variety of files including multimedia files. As a result, remote server interaction with large data files, stored on a SIM card, has become problematic.

Furthermore, Smart Card Web Server (SCWS) is a server built in a smart card, which can display files stored in the smart card to a user in a webpage format as requested by the user. SCWS technology enables mobile phone users to conveniently browse multimedia files of a smart card manufacturer in the form of webpages. However, current SCWS specifications do not describe how to implement information interaction between a remote management server and an SCWS in a smart card, and cannot perform remote control, remote data update, or configuration and customization of mobile phone contents.

SUMMARY

A method and system is provided for implementing a smart card remote operation based on a client mode of a smart card web server, so as to realize reliable update of bulk data, and to provide security identity authentication, implementation of data encryption and customizable access policies.

A method for implementing a smart card remote operation based on a smart card web server includes transmitting, by a remote management server, a short message of a SIM type to a mobile phone for prompting the mobile phone to update the content of the smart card. The method also includes transmitting, by the mobile phone, the short message to the smart card, wherein a smart card web server (SCWS) in the smart card instructs the mobile phone to establish a session channel for communications with the smart card, to establish a data channel for communications with the remote management server, to construct a mobile phone gateway in the client mode, and to connect the mobile phone gateway to the remote management server. According to the instruction by the smart card, the mobile phone gateway requests data from the remote management server, and forwards the response data from the remote management server to the smart card for data update of the smart card.

In a further embodiment, a method for implementing a smart card remote operation based on a smart card web server includes, prior to transmitting a short message by a remote management server to the mobile telephone, when a mobile phone is activated, initializing the smart card and choosing an application to activate SCWS in the smart card. Transmitting the short message from the mobile telephone to the smart card includes analyzing the short message transmitted by the mobile phone, which is processed by SCWS or its proxy program; and choosing, by the SCWS or its proxy program, a SIM card channel and instructing the mobile phone to get ready for connection to the remote management server. Transmitting the short message from the mobile telephone to the smart card includes examining, by the mobile phone, an execution environment, establishing a session channel with the smart card according to Bearer Independent Protocol, establishing an Hypertext Transfer Protocol (HTTP); Hypertext Transfer Protocol Secure (HTTPS) channel that connects with the remote management server, and then constructing a mobile phone gateway of the client mode.

In yet a further embodiment, a method for implementing a smart card remote operation based on a smart card web server the smart card establishes a plurality of data channels with the remote management server via the mobile phone for synchronous update of the data; the smart card chooses HTTP/HTTPS for connection with the remote management server via the mobile phone gateway, and chooses a format of the HTTP/HTTPS header is determined through prior negotiation with the remote management server.

In another embodiment, a system for implementing a smart card remote operation based on a smart card web server includes an update notification module for transmitting a short message of the SIM type via the remote management server to a mobile phone and prompting the mobile phone to update the content of the smart card; a gateway establishing module for instructing the mobile phone via the smart card web server (SCWS) in the smart card to establish a session channel for communications with the smart card and a data channel for connection with the remote management server, to construct a mobile phone gateway in the client mode, and to connect to the remote management server; a data update module for requesting data from the remote management server via the mobile phone gateway according to the instruction by the smart card, and for forwarding response data from the remote management server to the smart card for data update of the smart card.

In another embodiment, a system includes a SCWS activation module for, when a mobile phone is activated, initializing the smart card and choosing an application to activate SCWS in the smart card. The system also includes a gateway establishing module that includes a short message processing module for controlling the smart card to analyze the short message transmitted by the mobile phone, which is processed by SCWS or its proxy program. The system further includes a connection instructing module for choosing a SIM card channel, via SCWS or its proxy program, and instructing the mobile phone to get ready for connection to the remote management server. The system also includes a channel establishing module for examining the execution environment via the mobile phone, establishing a session channel with the smart card according to the Bearer Independent Protocol, and establishing a HTTP or HTTPS channel that connects with the remote management server. The channel establishing module is further used for the smart card to establish a plurality of data channels with the remote management server via the mobile phone for synchronous update of the data.

In another embodiment, a method and system for implementing a smart card remote operation based on a smart card web server includes addressing a mobile phone as a mobile phone is prompted to activate an update by a short message transmitted thereto. A remote network is accessed by using a Transmission Control Protocol/Internet Protocol (TCP/IP) protocol stack to conveniently and reliably update bulk data. The mobile phone is used as a gateway to connect a smart card and a remote management server, thereby realizing security identity authentication, data integrity verification, implementation of data encryption and customizable access policies, and increasing the demand of an operator for enhancing value-added services of the smart card.

DETAILED DESCRIPTION

Methods and systems for implementing a smart card remote operation based on a smart card web server are described in detail below with reference to the accompanying drawings. Specific embodiments described herein are included for illustrative purposes and are not intended to limit the scope of the claimed invention in any way.

A Smart Card Web Server (SCWS) technology of a SIM card may be employed to expand a SCWS client mode, install a gateway function module at a mobile phone end. The gateway may communicate with a UICC according to BIP (Bearer Independent Protocol), may establish or close communication channels, receive or may transmit data, and may synchronize the channel state according to instructions from the UICC. At the same time, the gateway may use a TCP/IP data stack to establish a channel that connects with a remote management server with a client mode, to request data from the remote management server through an HTTP/HTTPS protocol according to instructions from the UICC, and to forward data, received from the remote monitoring server, to the UICC after a certain level of data inspection and controlled encapsulation, such that the UICC updates SIM card data in the UICC according to a response from the remote management server.

Figure 1:
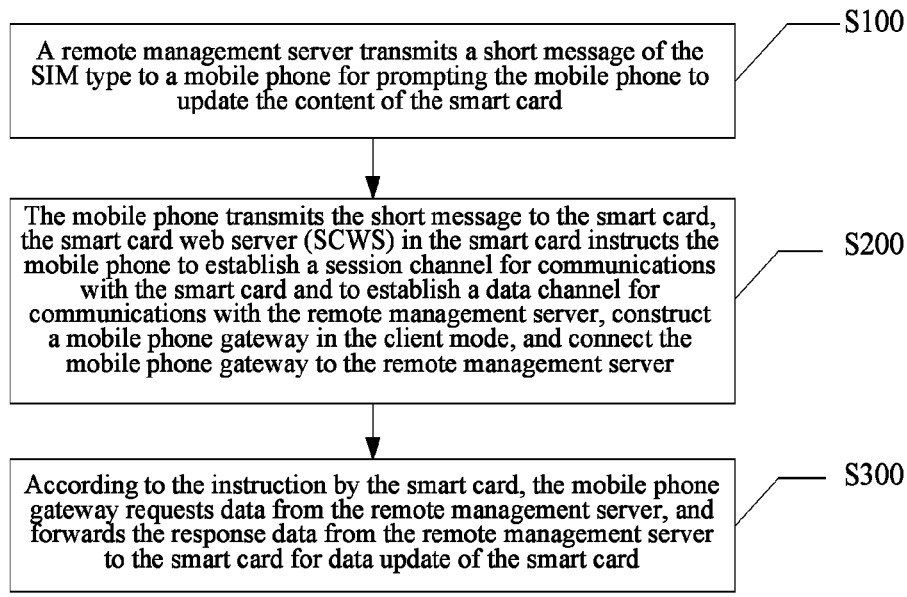
FIG. 1 depicts a flow chart of an example method for implementing a smart card remote operation based on a smart card web server provided by the present invention.

Turning to FIG. 1, a flow chart of a method for implementing a smart card remote operation based on a smart card web server may include transmitting, by a remote management server, a short message of a SIM type to a mobile phone for prompting the mobile phone to update the content of the smart card (block S100); by a mobile phone, a short message to a smart card (block S200). A smart card web server (SCWS) in the smart card may instruct the mobile phone to establish a session channel for communications with the smart card, establish a data channel for communications with a remote management server, construct a mobile phone gateway in a client mode, and connect the mobile phone gateway to the remote management server. According to the instruction by the smart card, the mobile phone gateway may request data from the remote management server and may forward response data from the remote management server to the smart card for data update of the smart card (block S300).

The above method is described in detail below with reference to a specific UICC card. A UICC (Universal Integrated Circuit Card) is a common type of smart card, i.e. a common type of mobile phone card. A UICC may have a built-in application Universal Subscriber Identity Module (USIM) (Subscriber Identity Module/Universal Identity Module (SIM/UIM)), USIM may correspond to implementing a smart card remote operation based on a smart card web server 3G network, SIM may correspond to a 2G network, and UIM may correspond to a Code division multiple access (CDMA) network, which may be collectively referred to as SIM in the context of the present disclosure.

In the process of power-on and activation, a mobile phone may initialize UICC according to an ISO/IEC7816 standard, and may add a sub-process to activate SCWS. There are at least two ways to activate a UICC, one of which is that a mobile phone may actively choose a SCWS application in a UICC, and the other is that a user may choose activation via a mobile phone. A SCWS application may be stored in a first layer file of UICC root files, and activation may be chosen through an AID (Application Identifier) entry.

In order to implement data interaction between a smart card and a remote management server and to complete a data update of the smart card, the remote management server may transmit a short message of a SIM type to a mobile phone. The short message may be a SCWS-related short message, which may contain information related to connecting with a remote management server for a UICC content update. A mobile phone may receive the short message and may encapsulate the short message and forward the short message to a UICC. The UICC may analyze the short message and may find that the short message is a SCWS-related short message, which may then be delivered to a SCWS, or its proxy program, for processing.

Encapsulation of a short message by a mobile phone may be performed to encapsulate content of the short message into an ENVELOPE type APDU (Application Protocol Data Unit). The ENVELOP may then be transmitted to a UICC via a specific port, for example, via a port defined by the Smart Card Association of the European Telecommunications Standards Institute. OTA short message technology may be employed, which can effectively avoid mobile phone addressing problems outline above. A channel is typically available to transmit a short message to a mobile phone, either in an idle state or via audio data services.

An ENVELOPE APDU, for interaction between a UICC and a mobile phone, may have five basic units and a dataset with variable length. CLA, as the term is used herein, may refer to a command set. An ENVELOPE, as used herein, may belong to a UICC command set and may have a value of 80. INS, as used herein, may refer to a command code, and a value of an ENVELOPE command code may be C2.

P1 and P2 are command parameters, Lc is the data length and, as used herein, P1 and P2 may be a SIM card short message immediately followed by content of the short message. After receiving APDU, a UICC may process a command CLA INS and may respond with a processing result. If response states SW1 and SW2 have a value of 90 00, the response state may indicate that the command has been received and correctly processed. Furthermore, a SCWS or its proxy program may choose a SIM card channel, which can be a basic channel or an expanded channel, and may instruct a mobile phone on an SID of the SIM card channel that there is a proactive command to be processed. In response, the mobile phone may acquire a proactive command via a Fetch APDU command of the SIM card. The command may instruct a smart card to get ready for connection to a remote management server. The mobile phone may examine an execution environment, and may establish a session channel with a UICC according to a BIP (Bearer Independent Protocol) in a load mode. A load mode may be GPRS, UMTS or WIFI. Each session channel may use a different session identifier (SID) for identification, all connection access data may be forwarded into a SID as indicated by a UICC, and the SID may physically identify a SIM card channel.

A mobile phone may employ an HTP/IP protocol to establish an HTTP or HTTPS channel with a remote management server. The mobile phone may then construct a mobile phone gateway that may connect a UICC and the remote management server such that the UICC is connected to the remote management server in a client mode via the mobile phone gateway for data update. The mobile phone gateway may communicate with a UICC by means of BIP, may communicate with the remote management server by means of TCP/IP, and may play a role of an agent for data forwarding between the UICC and the remote management server to realize data gateways for different protocol stacks.

When performing data update, a UICC may transmit data requested from the remote management server to the mobile phone gateway via a session channel established with the mobile phone gateway. The mobile phone gateway may transmit data requested by a UICC to the remote management server via an HTTP or HTTPS channel established with the remote management server. The remote management server may respond to the data requested by a UICC, and may forward response data to a UICC via the mobile phone gateway to realize data update of the UICC. Updated data of the UICC may be representative of value-added services of an operator or customized content of a mobile phone, thereby realizing remote data management and update of the UICC.

When a remote management server completes management, the remote management server may close an HTTP or HTTPS channel with the mobile phone gateway, and the mobile phone gateway may also notify a UICC to close a session channel with the mobile phone and end data update.

A UICC may establish a plurality of communication channels with a remote management server via a mobile phone gateway constructed on the mobile phone, which may depend on support by an associated SIM card and capability of an associated TCP/IP protocol stack on the mobile phone. Moreover, there may be more than one remote management server, and the mobile phone may use a secure or an unsecure connection. The mobile phone may perform integrality and confidentiality verification on data in the application layer, and may determine forwarding of the data according to a user-defined strategy.

During data update, a UICC may choose an HTTP/HTTPS channel to connect with a remote management server via a mobile phone gateway, and may safely update bulk data and information, including storage of user manuals, operator yellow books, advertisements, etc. On the other hand, requests by a UICC are usually submitted to a remote management server in a command HTTP POST format, wherein the construction of an HTTP/HTTPS header may be authenticated and negotiated with the remote management server in advance with respect to a format so as to avoid monitoring and forgery by a third party. Of course, authentication with a digital certificate may be used as an additional step for SIM card authentication, as the SIM card authentication may become invalid, e.g. during a WIFI connection. In circumstances where a USB-UICC interface is implemented on a mobile phone, a SCWS may directly use a TCP/IP data stack for connection to a remote management server, thereby avoiding BIP and making update of UICC data more effective.

Based on the above method for implementing a smart card remote operation based on a smart card web server, a system for implementing a smart card remote operation based on a smart card web server may be provided.

Figure 2:
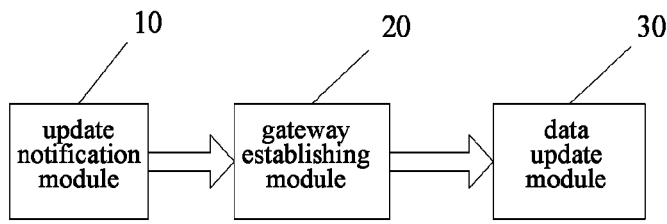
FIG. 2 illustrates a structure of an example system for implementing a smart card remote operation based on a smart card web server provided by the present invention.

Turning to FIG. 2, a system may include an update notification module 10 for transmitting a short message of a SIM type via a remote management server to a mobile phone and for prompting the mobile phone to update content of a smart card; a gateway establishing module 20 for instructing the mobile phone via a smart card web server (SCWS) in the smart card to establish a session channel for communications with the smart card, establishing a data channel for connection with the remote management server, to construct a mobile phone gateway in a client mode, and to connect to the remote management server; a data update module 30 for requesting data from the remote management server via the mobile phone gateway according to the instruction by the smart card, and for forwarding response data from the remote management server to the smart card for data update of the smart card.

Figure 3:
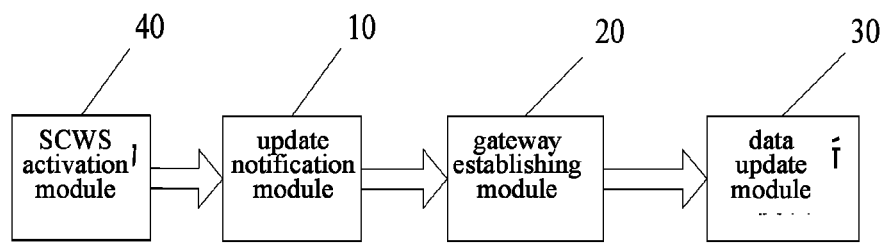
FIG. 3 illustrates a structure of another example system for implementing a smart card remote operation based on a smart card web server provided by the present invention.

With reference to FIG. 3, the system may include a SCWS activation module 40 for, when a mobile phone is activated, initializing the smart card and for choosing an application to activate an SCWS in the smart card.

Figure 4:
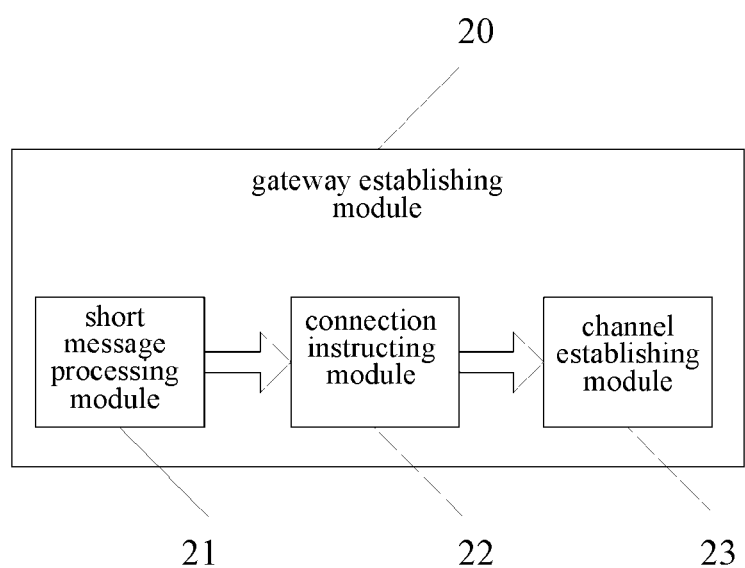
FIG. 4 illustrates a structure of an example gateway establishing module in a system for implementing a smart card remote operation based on a smart card web server provided by the present invention.

Turning to FIG. 4, the gateway establishing module 20 may include a short message processing module 21 for controlling a smart card to analyze a short message transmitted by a mobile phone, which may be processed by a SCWS or its proxy program. The short message processing module 21 may include a connection instructing module 22 for choosing a SIM card channel via an SCWS or its proxy program and for instructing the mobile phone to get ready for connection to a remote management server; a channel establishing module 23 for examining an execution environment via a mobile phone, for establishing a session channel with a smart card according to a Bearer Independent Protocol, for establishing an HTTP or HTTPS channel that may connect with a remote management server and for a smart card to establish a plurality of data channels with a remote management server via the mobile phone for synchronous update of data.

In accordance with a method and system for implementing a smart card remote operation based on a smart card web server, as a mobile phone is prompted to activate update by a short message transmitted thereto, the mobile phone is effectively addressed. A remote network may be accessed by using a TCP/IP protocol stack to conveniently and reliably update bulk data. The mobile phone may be used as a gateway to connect a smart card and a remote management server, thereby realizing security identity authentication, data integrality verification, implementation of data encryption and customizable access policies, and increasing demand of an operator for enhancing value-added services of a smart card.

It should be understood that applications of the present invention are not limited to the above examples. Improvements and modifications based on the description above shall be considered as being within the scope of the appended claims.

The invention claimed is:

1. A method for implementing a smart card remote operation based on a smart card web server (SCWS) in a smart card comprising a Universal Integrated Circuit Card (UICC), the method comprising:
   transmitting, by a remote management server, a short message to a mobile phone, wherein the short message contains SCWS related information for updating content of the smart card;
   transmitting, by the mobile phone, the short message to the smart card to cause the SCWS to instruct the mobile phone to establish a session channel including a session identifier for communication with the smart card; to establish a data channel for communications with the remote management server; to construct a mobile phone gateway in the client mode; and to connect the mobile phone gateway to the remote management server; and
   requesting, by the mobile phone gateway, according to the instruction by the smart card, data from the remote management server; wherein the mobile phone gateway forwards response data from the remote management server to the smart card for data update of the smart card, wherein the gateway communicates with the smart card according to Bearer Independent Protocol (BIP), and synchronizes a channel state according to instructions from the smart card, and
   wherein the gateway forwards data after data inspection and controlled encapsulation, such that the UICC updates Subscriber Identity Module (SIM) card data in the UICC according to a response from the remote management server.

2. The method as set forth in claim 1, wherein transmitting the short message from the mobile phone to the smart card includes:
   analyzing, by the smart card, the short message transmitted by the mobile phone, which is processed by the SCWS or its proxy program; and
   choosing, by the SCWS or its proxy program, a Subscriber Identity Module (SIM) card channel, wherein the SCWS, or its proxy program, instructs the mobile phone to get ready for connection to the remote management server.

3. The method as set forth in claim 1, wherein transmitting the short message from the mobile phone to the smart card includes: examining, by the mobile phone, the execution environment, wherein the mobile phone establishes a session channel with the smart card according to a Bearer Independent Protocol, establishes a Hypertext Transfer Protocol (HTTP) or Hypertext Transfer Protocol Secure (HTTPS) channel that connects with the remote management server, and then constructs a mobile phone gateway of a client mode.

4. The method as set forth in claim 1, wherein the smart card establishes a plurality of data channels with the remote management server via the mobile phone for synchronous update of the data.

5. The method as set forth in claim 4, wherein the session channel uses different session identifiers (SIDS) for identification and wherein all connection access data is forwarded into the SID as indicated by the UICC, and the SID physically identifies a SIM card channel.

6. The method as set forth in claim 1, wherein the smart card chooses HTTP/HTTPS for connection with the remote management server via the mobile phone gateway, and a format of an HTTP/HTTPS header is determined through prior negotiation with the remote management server.

7. A method as set forth in claim 1, further comprising:
   initializing, when a mobile phone is activated, the smart card and choosing an application to activate the SCWS in the smart card.

8. The method as set forth in claim 7, wherein transmitting the short message from the mobile phone to the smart card includes:
   analyzing, by the smart card, the short message transmitted by the mobile phone, which is processed by SCWS or its proxy program; and
   choosing, by the SCWS or its proxy program, a SIM card channel, wherein the SCWS, or its proxy program, instructs the mobile phone to get ready for connection to the remote management server.

9. The method as set forth in claim 7, wherein transmitting the short message from the mobile phone to the smart card includes:
   examining, by the mobile phone, the execution environment, wherein the mobile phone establishes a session channel with the smart card according to a Bearer Independent Protocol, establishes a HTTP or HTTPS channel that connects with the remote management server, and then constructs a mobile phone gateway of a client mode.

10. The method as set forth in claim 9, wherein the smart card establishes a plurality of data channels with the remote management server via the mobile phone for synchronous update of the data.

11. The method as set forth in claim 10, wherein the session channel uses different session identifiers (SIDs) for identification and wherein all connection access data is forwarded into the SID as indicated by the UICC, and the SID physically identifies a SIM card channel.

12. The method as set forth in claim 9, wherein when the remote management server completes management, it closes the HTTP or HTTPS channel with the mobile phone gateway, and the mobile phone gateway also notifies the UICC to close the session channel with the mobile phone and end data update.

13. The method as set forth in claim 7, wherein the mobile phone performs integrality and confidentiality verification on the data in an application layer, and determines forwarding data according to a user-defined strategy.

14. A system for implementing a smart card remote operation based on a smart card web server (SCWS) in a smart card comprising a Universal Integrated Circuit Card (UICC), the system comprising:
   updating a notification for transmitting a short message containing information related to connecting with a remote management server, via the remote management server, to a mobile phone and prompting the mobile phone to update content of the smart card;

establishing a gateway for instructing the mobile phone, via the SCWS, to establish a session channel for communication with the smart card according to a Bearer Independent Protocol (BIP) in a load mode and a data channel for connection with the remote management server, to construct a mobile phone gateway in the client mode, and to connect to the remote management server; and updating a data of the smart card for requesting data from the remote management server via the mobile phone gateway according to the instruction by the smart card, and forwarding response data from the remote management server to the smart card for data update of the smart card, wherein the gateway synchronizes a channel state according to instructions from the smart card, and wherein the gateway forwards data after data inspection and controlled encapsulation, such that the UICC updates Subscriber Identity Module (SIM) card data in the UICC according to a response from the remote management server.

15. The system as set forth in claim 14, further comprising:

processing a short message for controlling the smart card to analyze the short message transmitted by the mobile phone, wherein the short message is processed by SCWS or its proxy program;

instructing a connection for choosing a SIM card channel via SCWS or its proxy program and instructing the mobile phone to get ready for connection to the remote management server; and establishing a channel for examining an execution environment via the mobile phone, establishing a session channel with the smart card according to the BIP, and establishing a Hypertext Transfer Protocol (HTTP) or Hypertext Transfer Protocol Secure (HTTPS) channel that connects with the remote management server.

16. The system as set forth in claim 15, wherein the establishing channel is further used for the smart card to establish a plurality of data channels with the remote management server via the mobile phone for synchronous update of the data.

17. A smart card remote operation based system comprising:

updating a notification by receiving a short message from a remote management server to a mobile phone, to encapsulate the short message by an ENVELOPE command Application Protocol Data Unit, and to prompt the mobile phone to update content of the smart card;

establishing a gateway by instructing the mobile phone, via the smart card web server (SCWS) in the smart card comprising a Universal Integrated Circuit Card (UICC), to establish a session channel for communications with the smart card, to establish a data channel for connection with the remote management server, to construct a mobile phone gateway in the client mode, and to connect to the remote management server, wherein the gateway is configured to communicate with a UICC according to Bearer Independent Protocol (BIP), and to synchronize a channel state according to instructions from the UICC; and updating, using the UICC, Subscriber Identity Module (SIM) card data in the UICC by requesting data from the remote management server, via the mobile phone gateway, according to the instruction by the smart card, and forwarding response data from the remote management server to the smart card for data update of the smart card.

18. The smart card remote operation based system as set forth in claim 17, further comprising:

controlling the smart card to analyze the short message transmitted by the mobile phone, wherein the short message is processed by SCWS or its proxy program;

choosing a SIM card channel, via SCWS or its proxy program, and instructing the mobile phone to get ready for connection to the remote management server; and examining an execution environment via the mobile phone, to establish a session channel with the smart card according to the Bearer Independent Protocol, and establishing a Hypertext Transfer Protocol (HTTP) or Hypertext Transfer Protocol Secure (HTTPS) channel that connects with the remote management server.

19. The smart card remote operation based system as set forth in claim 18, wherein establishing a channel further causes the smart card to establish a plurality of data channels with the remote management server via the mobile phone for synchronous update of the data.

20. The smart card remote operation based system as set forth in claim 17, further comprising:

when a mobile phone is activated, initializing the smart card and to choose an application to activate the SCWS in the smart card.

* * * * *